(12) United States Patent
Hatano et al.

(10) Patent No.: US 9,919,392 B2
(45) Date of Patent: Mar. 20, 2018

(54) METHOD FOR MANUFACTURING TURBINE ROTOR BLADE

(71) Applicant: MITSUBISHI HITACHI POWER SYSTEMS, LTD., Kanagawa (JP)

(72) Inventors: Kohei Hatano, Tokyo (JP); Hiroharu Oyama, Tokyo (JP); Motonari Machida, Tokyo (JP); Hidetaka Haraguchi, Tokyo (JP); Ken Ishii, Tokyo (JP); Keisuke Kamitani, Tokyo (JP); Takumi Matsumura, Tokyo (JP); Takahiro Ota, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 331 days.

(21) Appl. No.: 14/650,738

(22) PCT Filed: Dec. 18, 2013

(86) PCT No.: PCT/JP2013/083954
§ 371 (c)(1),
(2) Date: Jun. 9, 2015

(87) PCT Pub. No.: WO2014/098151
PCT Pub. Date: Jun. 26, 2014

(65) Prior Publication Data
US 2016/0184940 A1 Jun. 30, 2016

(30) Foreign Application Priority Data
Dec. 19, 2012 (JP) .................. 2012-277349

(51) Int. Cl.
*B23P 15/02* (2006.01)
*B21K 3/04* (2006.01)
*F01D 5/14* (2006.01)

(52) U.S. Cl.
CPC ............... *B23P 15/02* (2013.01); *B21K 3/04* (2013.01); *F01D 5/141* (2013.01); *F05D 2220/31* (2013.01); *F05D 2230/25* (2013.01)

(58) Field of Classification Search
CPC .... B21K 3/04; B23P 15/02; F01D 5/14–5/20; F05B 2230/10–2230/103
See application file for complete search history.

(56) References Cited

U.S. PATENT DOCUMENTS 2,415,847 A * 2/1947 Redding ............... F04D 29/324
 29/889.21
2,826,123 A * 3/1958 Leverington ............. B23C 3/18
 409/290

(Continued)

FOREIGN PATENT DOCUMENTS

CN 1062577 7/1992
EP 1 629 906 3/2006
(Continued)

OTHER PUBLICATIONS

Office Action dated Nov. 2, 2015 in Chinese Application No. 201380065054.X, with English translation.
(Continued)

*Primary Examiner* — Jacob Cigna
(74) *Attorney, Agent, or Firm* — Wenderoth, Lind & Ponack, L.L.P.

(57) ABSTRACT

A method for manufacturing a turbine rotor blade wherein warping, bending and twisting of the entire rotor blade, which is provided with an excess thickness portion after a forging step, can be suppressed. In the forging step in a process for manufacturing a rotor blade (23), the forging is hot-forged such that the distance (the excess thickness amount) from the blade surface of the blade section (23) to the surface of the excess thickness section is substantially uniform along the entire periphery of a cross section of the
(Continued)

blade section (23) and the excess thickness section (31) perpendicular to the blade length direction, and such that the amount of the excess thickness in the blade length direction, which is the thickness of the excess thickness section (31), gradually increases toward the blade tip from a prescribed position.

4 Claims, 8 Drawing Sheets

(56) References Cited

U.S. PATENT DOCUMENTS

| | | | | |
|---|---|---|---|---|
| 3,412,611 | A * | 11/1968 | Whitaker | B21K 3/04 |
| | | | | 29/889.7 |
| 4,031,809 | A * | 6/1977 | Shraiman | B23C 3/18 |
| | | | | 409/132 |
| 4,893,388 | A * | 1/1990 | Amos | B23K 9/046 |
| | | | | 228/119 |
| 5,288,209 | A * | 2/1994 | Therrien | F01D 5/22 |
| | | | | 318/568.1 |
| 6,127,044 | A | 10/2000 | Yamamoto et al. | |
| 6,910,270 | B2 * | 6/2005 | Brock | B23P 15/02 |
| | | | | 29/557 |
| 7,334,332 | B2 | 2/2008 | Ferte et al. | |
| 8,056,227 | B2 * | 11/2011 | DeMania | B23P 6/005 |
| | | | | 29/889.21 |
| 2002/0014006 | A1 * | 2/2002 | Brock | B23P 15/02 |
| | | | | 29/889.7 |
| 2010/0199496 | A1 * | 8/2010 | DeMania | B23P 6/005 |
| | | | | 29/889.23 |

FOREIGN PATENT DOCUMENTS

| | | |
|---|---|---|
| FR | 2 916 667 | 12/2008 |
| JP | 55-27813 | 2/1980 |
| JP | 62-158542 | 7/1987 |
| JP | 63-112039 | 5/1988 |
| JP | 63-123546 | 5/1988 |
| JP | 1-202389 | 8/1989 |
| JP | 3531677 | 5/2004 |
| WO | 2012/043374 | 4/2012 |

OTHER PUBLICATIONS

Extended European Search Report dated Feb. 8, 2016 in European Application No. 13864930.6.
Decision of a Patent Grant dated Apr. 12, 2016 in Japanese Application No. 2012-277349, with English translation.
Notification on the Grant of Patent Right for Invention dated Jun. 23, 2016 in corresponding Chinese Application No. 201380065054.X, with English translation.
Notification for Patent Registration Formalities dated Jun. 23, 2016 in corresponding Chinese Application No. 201380065054.X, with English translation.
English Translation of Written Opinion of the International Searching Authority dated Mar. 11, 2014 in International (PCT) Application No. PCT/JP2013/083954.
Communication under Rule 71(3) EPC dated Dec. 14, 2016 in corresponding European Application No. 13864930.6.
International Search Report dated Mar. 11, 2014 in International (PCT) Application No. PCT/JP2013/083954.
Notice of Allowance dated Jul. 29, 2016 in Korean Application No. 10-2015-7015873, with partial English translation.

* cited by examiner

METHOD FOR MANUFACTURING TURBINE ROTOR BLADE

TECHNICAL FIELD

The present invention relates to a method for manufacturing a turbine rotor blade which molds a blade section including an excess thickness section by forging.

BACKGROUND ART

In a general turbine (for example, a steam turbine), a rotor which is a rotary shaft is rotatably supported by a casing, a rotor blade is installed on the outer peripheral section of the rotor, a stator blade is installed on the inner wall of the casing, and a plurality of the rotor blades and a plurality of the stator blades are alternately provided in a steam passage. Moreover, the rotor blades and the rotor are rotatably driven while steam flows into the steam passage.

In this steam turbine, the rotor blade includes a blade base section which is fixed to a rotor disk of the rotor, a platform which is integrally formed with the blade base section, a blade section in which the base end section is joined to the platform and extends to the tip section side, and a shroud which is connected to the tip section of the blade section. In addition, the rotor blades are fixed so that a plurality of the base end sections are arranged along the peripheral direction on the outer peripheral section of the rotor disk, and are annularly disposed around the axial direction of the rotor so that the shrouds of the tip section come into contact with each other.

As a method for manufacturing the steam turbine rotor blade, for example, in PTL 1, a method for manufacturing a turbine blade (rotor blade) made of a titanium alloy capable of withstanding erosion (corrosion) and having excellent reliability is disclosed. The method for manufacturing the blade includes a forging step of forming the turbine blade made of the titanium alloy by hot-forging, a step of more rapidly cooling the tip side of the blade leading edge section of the turbine blade including a cover formed by the hot-forging than a blade main body, and a step of heat-treating the turbine blade after the cooling.

CITATION LIST

Patent Literature

PTL 1: Japanese Patent No. 3531677

SUMMARY OF INVENTION

Technical Problem

In the above-described method for manufacturing the blade, generally, a machining step of cutting the rotor blade to form a final blade surface shape of the rotor blade after the step of the heat-treating is performed. In this way, in order to perform the cutting of the rotor blade in the machining step, as shown in FIG. 10, in the forging step, it is necessary to perform the forging in a state where an excess thickness section 131a becoming a portion to be cut is provided on a blade section 123 of the rotor blade. Specifically, FIG. 10 shows the cross section of the blade section 123 in a state where the excess thickness section 131a is provided so that a distance from the blade surface of the blade section 123 of the rotor blade to the surface of the excess thickness section 131a is substantially uniform over the entire blade surface.

When the rotor blade is formed by forging, in the blade section 123 on which the excess thickness section 131a is provided, there are a portion having a thick plate thickness and a portion having a thin plate thickness in a blade length direction. In addition, in a step of cooling the blade section 123 having the forged excess thickness section 131a after the forging step ends, a temperature difference is generated between the portion having the thick plate thickness and the portion having the thin plate thickness in the blade length direction, and thus, heat stress is generated in the inner portions of the blade section 123 and the excess thickness section 131a. The heat stress increases as the temperature difference increases, and particularly, plastic deformation may locally occur in the blade section 123 and the excess thickness section 131a in the portion having a thin plate thickness. Moreover, due to the local plastic deformation, residual stress may occur, and warping, bending, or twisting (hereinafter, referred to as "deformation of the entire blade") of the entire blade section 123 may occur.

FIG. 11 shows a deformation amount of the entire blade at a position in the blade length direction from a platform of the blade section 123 in each combination between a weight ratio and the thickness of the excess thickness section 131a. The "weight ratio" indicates a ratio of a sum of the weight of the blade section 123 and the excess thickness section 131a with respect to the weight of the blade section 123. As shown in FIG. 11, the deformation amount of the entire blade in the blade base side having a great plate thickness is small. However, the deformation amount of the entire blade is likely to gradually increase toward the blade tip side having a small plate thickness. When the deformation of the entire blade occurs, in order to perform a step of heat-treating and a machining step which are the subsequent steps, a processing of returning the shape of the blade section 123 to a shape similar to the shape of the final blade section 123 by cold working such as manual working or simple pressing is required. As a result, there is a concern that work efficiency may be decreased. In addition, deviation in the shape of the final blade section 123 may occur due to the manual working, the simple pressing, or the like.

Moreover, as described above, when a local plastic deformation occurs during the heat treating, or when the cold working such as the manual working or the simple pressing for correcting the deformation of the entire blade to a shape similar to the shape of the final blade section 123 is performed to carry out the step of the heat-treating and the machining step which are the subsequent steps, residual stress remains on the blade. In addition, a debarring step, when portions (burrs) unnecessary in the forging are removed, or when the excess thickness section 131a is cut in the machining step, the residual stress is released, and thus, the warping, bending, or twisting of the entire blade section 123 may occur. In addition, in the heat treatment step which is generally performed before the machining step, when a yield point is decreased due to the heating, the residual stress is released, and thus, the warping, bending, or twisting of the entire blade section 123 may occur. Moreover, also during the cooling after the heating of the forging in the heat treatment step, the temperature difference is generated between the portion having a thick plate thickness and the portion having a thin plate thickness in the blade length direction, and heat stress occurs in the inner portions of the blade section 123 and the excess thickness section 131a. The heat stress increases as the temperature difference increases, and particularly, the plastic deformation may locally occur in the blade section 123 and the excess thickness section 131a in the portion having a thin plate thickness. Moreover, due to the local plastic deformation, the residual stress occurs, and the warping, bending, or twisting of the entire blade section 123 may occur.

An object of the present invention is to provide a method for manufacturing a turbine rotor blade wherein the warping, bending, or twisting of the entire rotor blade, which is provided with the excess thickness section after the forging step, is suppressed.

Solution to Problem

In order to achieve the object, according to a method for manufacturing a turbine rotor blade of the present invention, there is provided a method for manufacturing a turbine rotor blade in which a plurality of the rotor blades are fixed to be arranged along the peripheral direction of a rotor on the outer periphery of the rotor rotatably supported in a turbine, including: a forging step of providing an excess thickness section on a blade section of the rotor blade, and molding a forging, in which an excess thickness amount which is the thickness of the excess thickness section gradually increases from a prescribed position of the blade section in a blade length direction toward a blade tip side, by die forging; and a machining step of cutting the excess thickness section from the forging and forming the blade section. In the steps, in the forging step, the prescribed position may be any position between the base end section of the blade section and the center section of the blade section, may be any position between the base end section of the blade section and a position at which a stub is formed in the blade section, or may be any position between the base section of the blade end section and ¼ of the length of the blade section in the blade length direction.

Accordingly, in the blade length direction of the forging (including the blade section provided with the excess thickness section) which is molded by the die forging in the forging step, the difference in the thickness between a portion having a thick plate thickness and a portion having a thin plate thickness is substantially removed or decreased, and thus, the temperature difference of the entire forging is decreased. In addition, stiffness of the entire forging is improved. Therefore, in a cooling step which is the next step of the forging step, heat stress does not easily occur in the inner portions of the blade section and the excess thickness section, and it is possible to suppress occurrence of local plastic deformation of the blade section and the excess thickness section in the blade length direction. Since the occurrence of the local plastic deformation is suppressed, it is possible to suppress occurrence of warping, bending, or twisting of the entire blade section, and it is also possible to decrease residual stress occurring in the cooling step. In addition, since it is not also necessary to perform the processing which returns the blade section to a shape similar to the shape of the final blade section by cold working such as manual working or simple pressing when the deformation of the entire blade is generated, or only the minimum work is required even when the manual working or the like is necessary, occurrence of the residual stress is suppressed, deviation in the shape of the blade section is suppressed, and it is possible to decrease the work cost. Moreover, since the occurrence of the residual stress is suppressed during the cooling step, when the unnecessary portions (burrs) of the forging are removed in a deburring step or when the excess thickness section is cut in the machining step, the release amount of the residual stress is decreased, and it is possible to suppress the occurrence of the warping, bending, or twisting of the entire blade section. In addition, in the heat treatment step which is generally performed before the machining step, even when the yield point is decreased due to the heating, the release amount of the residual stress is decreased, and it is possible to suppress the occurrence of the warping, bending, or twisting of the entire blade section. In addition, also when the forging is cooled after being heated in the heat treatment step, since the temperature difference between the portion having a thick plate thickness and the portion having a thin plate thickness in the blade length direction is decreased, the heat stress in the inner portions of the blade section and the excess thickness section does not easily occur, and it is possible to suppress the occurrence of the local plastic deformation of the blade section and the excess thickness section in the blade length direction. Since the occurrence of the local plastic deformation is suppressed, the occurrence of the residual stress is suppressed, and it is possible to suppress occurrence of warping, bending, or twisting of the entire blade section.

In the forging step, it is preferable to mold the forging, in which the excess thickness amount is substantially uniform in the entire periphery of the cross section of the blade section perpendicular to the blade length direction in at least a portion of the blade section and the excess thickness section in the blade length direction, by die forging.

Accordingly, in addition to above-described effects, in the cooling step after the forging step, even when a certain level of plastic deformation occurs on the blade tip side portion of the forging in the blade length direction, since the excess thickness amount of the blade tip side portion is greater than the excess thickness amount of the blade base side portion, the final shape of blade section satisfies the forging in which the plastic deformation is locally generated. As a result, since it is not necessary to perform the processing which returns the blade section to the shape similar to the shape of the final blade section by cold working such as manual working or simple pressing, it is possible to suppress the residual stress generated due to the processing.

In the forging step, it is preferable to mold the forging, in which the excess thickness amount in edge sections, which are both end portions in the length direction of a cross section perpendicular to the blade length direction in at least a portion of the blade section and the excess thickness section in the blade length direction, is greater than the excess thickness amount in a maximum diameter section in which the plate thickness of the blade section in the cross section of the blade section is the thickest, by die forging. Moreover, in the forging step, it is preferable to perform the die forging so that the plate thickness of the forging in the edge section of the cross section is equal to or more than the plate thickness of the forging in the maximum diameter section.

Accordingly, in the length directions of the cross sections of the blade section and the excess thickness section of the forging perpendicular to the blade length direction, the difference in the thicknesses between the portion having a thick plate thickness and the portion having a thin plate thickness is substantially removed or decreased. Therefore, since the temperature difference in the entire forging is decreased, in the cooling step which is the next step of the forging step, heat stress does not easily occur in the inner portions of the blade section and the excess thickness section, occurrence in the local plastic deformation in the length direction of the cross section is suppressed, occurrence of the residual stress is suppressed, and it is possible to suppress occurrence of warping, bending, or twisting of the entire blade section.

Moreover, in the method for manufacturing a turbine rotor blade according to the present invention, in the forging step, it is preferable to mold, with respect to the excess thickness amount in edge sections which are both end portions in the length direction of a cross section perpendicular to the blade length direction in at least a portion of the blade section and the excess thickness section in the blade length direction, the forging in which the excess thickness amount of the side in which the shape of the cross section is a concave shape is smaller than the excess thickness amount of the side in which the shape of the cross section is a convex shape, by die forging.

Accordingly, since the degree of curvature in the length direction of the cross sections of the blade section and the excess thickness section perpendicular to the blade length direction is decreased, even when heat stress occurs in the cooling step, occurrence in the local plastic deformation in the length direction of the cross section is suppressed, occurrence of the residual stress is suppressed, and it is possible to suppress occurrence of warping, bending, or twisting of the entire blade section.

Moreover, in the method for manufacturing a turbine rotor blade according to the present invention, in the forging step, it is preferable to mold the forging, in which the excess thickness amount of at least a portion of the excess thickness section provided in the stub of a cross section perpendicular to a blade length direction of the blade section and the excess thickness section in the position at which the stub of the blade section is formed is smaller than the excess thickness amount of the excess thickness section provided in a portion other than the stub of the cross section, by die forging.

Accordingly, it is possible to decrease the difference between the area of the cross section of the forging perpendicular to the blade length direction in the position at which the stub is formed in the blade section, and the areas of the cross sections at other positions. As a result, in the cooling step which is the next step of the forging step, the heat stress in the inner portion of the forging does not easily occur, occurrence of the plastic deformation in the blade length direction of the forging is suppressed, occurrence of the residual stress is suppressed, and it is possible to suppress the warping, bending, or twisting of the entire blade section.

Advantageous Effects of Invention

According to the present invention, it is possible to provide a method for manufacturing a turbine rotor blade wherein warping, bending, or twisting of the entire rotor blade, which is provided with an excess thickness section after a forging step, is suppressed.

DESCRIPTION OF EMBODIMENTS

Embodiments of the present invention will be described in detail with reference to the drawings.

First Embodiment (Schematic Configuration of Steam Turbine 1)

Figure 1:
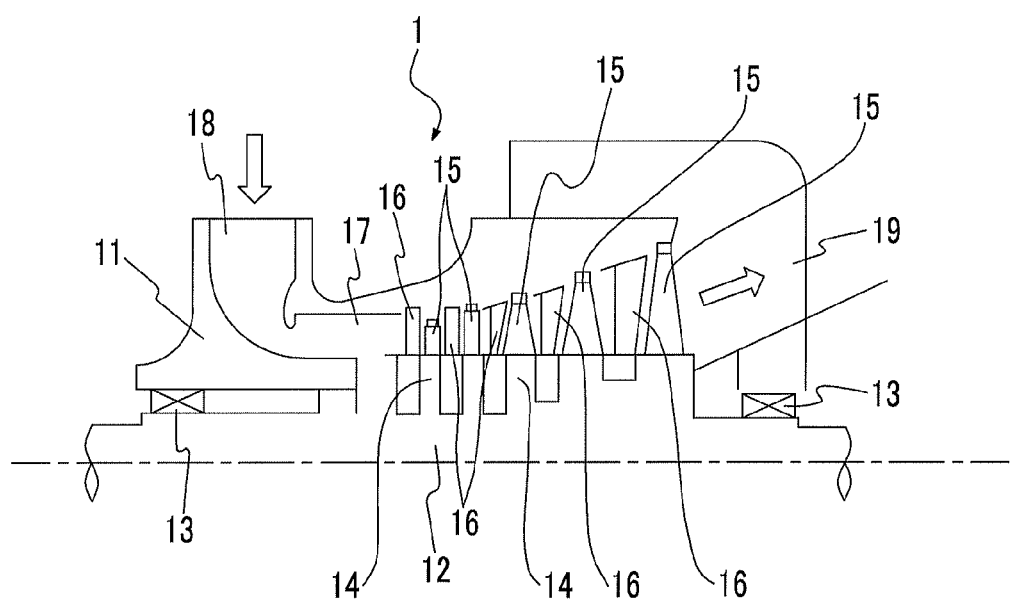
FIG. 1 is a schematic configuration view of a steam turbine including a rotor blade according to a first embodiment.

FIG. 1 is a schematic configuration view of a steam turbine including a rotor blade according to a first embodiment. Hereinafter, with reference to FIG. 1, an outline of a structure of a steam turbine 1 according to the first embodiment will be described.

As shown in FIG. 1, in the steam turbine 1, a casing 11 is formed in a hollow shape, and a rotor 12 which is a rotary shaft is rotatably supported by a plurality of bearings 13. Rotor blades 15 and stator blades 16 are disposed in the casing 11. A plurality of the rotor blades 15 are fixed to be arranged along the peripheral direction on the outer periphery of a disk-shaped rotor disk 14 formed on the rotor 12. A plurality of the stator blades 16 are fixed to be arranged along the peripheral direction on the inner wall of the casing 11. The rotor blades 15 and the stator blades 16 are alternately disposed along the axial direction of the rotor 12.

In addition, the rotor blades 15 and the stator blades 16 are disposed in the casing 11, and thus, a steam passage 17 through which steam passes is formed. In the steam passage 17, a steam supply port 18 which is an inlet through which the steam is supplied is formed, and a steam discharge port 19 which is an outlet through which the steam is discharged to the outside is formed.

(Schematic Operation of Steam Turbine 1)

Next, with reference to FIG. 1, the outline of the operation of the steam turbine 1 will be described.

The steam is expanded while the steam supplied from the steam supply port 18 of the steam turbine 1 to the steam passage 17 passes through the stator blades 16, and becomes a high speed steam flow. The high-speed steam flow passing through the stator blades 16 is sprayed to the rotor blades 15, and rotates the plurality of rotor blades 15 and the rotor 12 to which the rotor blades are attached. For example, a power generator or the like is connected to the rotor 12, the power generator is driven by rotating the rotor 12, and thus, power is generated. The steam, which passes through the portion in which the stator blades 16 and the rotor blades 15 of the steam passage 17 are disposed, is discharged from the steam discharge port 19 to the outside.

(Structure of Rotor Blade 15)

Figure 2:
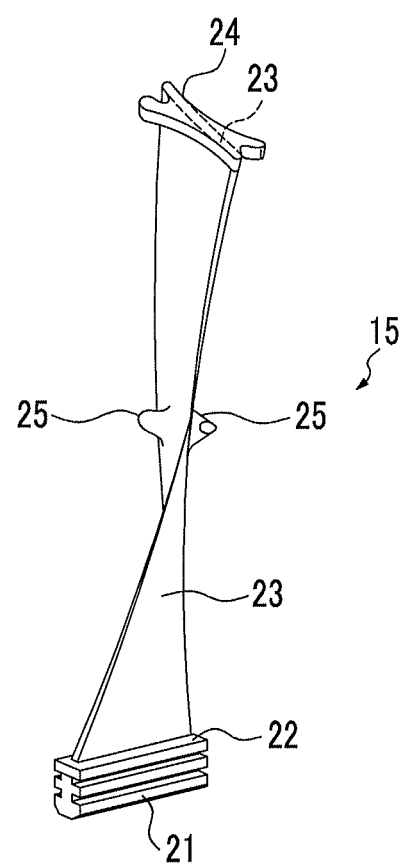
FIG. 2 is a schematic view showing the rotor blade of the first embodiment.

FIG. 2 is a schematic view showing the rotor blade of the first embodiment. With reference to FIG. 2, the structure of the rotor blade 15 of the first embodiment will be described.

As shown in FIG. 2, the rotor blade 15 includes a blade base section 21, a platform 22, a blade section 23, and a shroud 24.

The blade base section 21 is embedded to the rotor disk 14, and thus, the rotor blade 15 is fixed to the rotor disk 14 by the blade base section. The platform 22 has a curved plate-shaped material which is integrated with the blade base section 21. In the blade section 23, the base end section is fixed to the platform 22, the tip section extends to the inner wall surface side of the casing 11, and the blade section is twisted in the blade length direction. The shroud 24 is fixed to the tip section of the blade section 23, comes into contact with the adjacent shroud 24 of the rotor blade 15, and is a member which fixes the rotor blade 15 or suppresses the vibration of the rotor blade 15.

Moreover, protrusion-shaped stubs 25 are formed at the approximately centers in the blade length direction in both blade surfaces of the blade section 23. The stub 25 comes into contact with the adjacent stub 25 of the rotor blade 15 and is a member which fixes the rotor blade 15 and suppresses the vibration of the rotor blade 15.

(Process for Manufacturing Rotor Blade 15)

Figure 3:
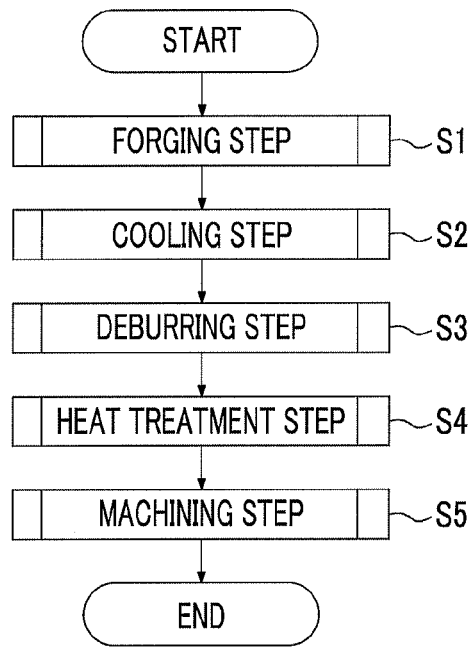
FIG. 3 is a flowchart showing a process for manufacturing the rotor blade of the first embodiment.
Figure 4:
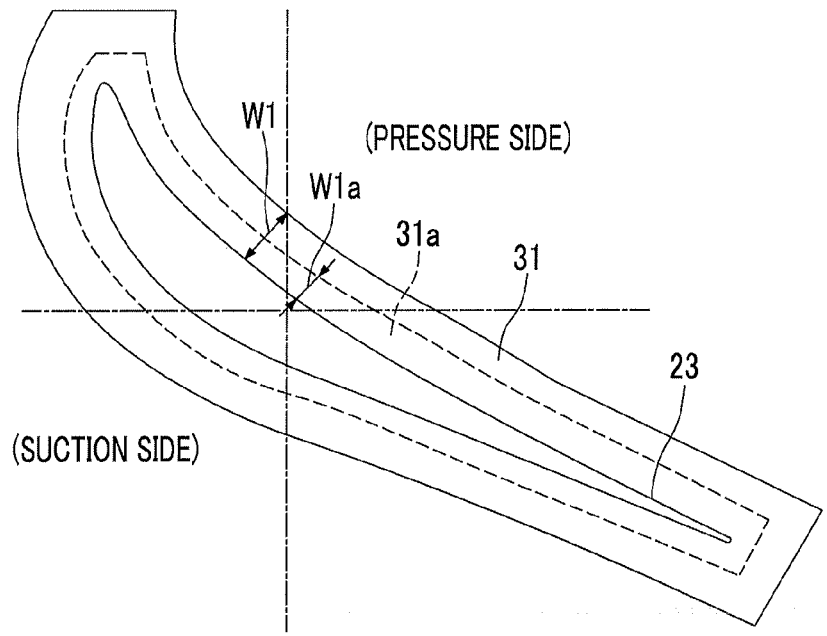
FIG. 4 is a cross-sectional view of the rotor blade including the excess thickness section after the forging in the first embodiment.

FIG. 3 is a flowchart showing a process for manufacturing the rotor blade of the first embodiment, and FIG. 4 is a cross-sectional view of the rotor blade including an excess thickness section after forging in the first embodiment. With reference with FIGS. 3 and 4, the process for manufacturing the rotor blade 15 of the first embodiment, and particularly, the process for manufacturing the blade section 23 of the rotor blade 15 will be described.

The process for manufacturing the blade section 23 includes a forging step (Step S1), a cooling step (Step s2), a deburring step (Step S3), a heat treatment step (Step S4), and a machining step (Step S5).

In the forging step of Step S1, a forging material (for example, stainless steel or the like) which is heated to a high temperature of a recrystallization temperature is disposed in one set of upper and lower molds which is processed to be the shape of the blade section 23 including an excess thickness section 31 as shown in FIG. 4, and hot-forging is performed on the forging material. When the hot-forging ends, as shown in FIG. 4, a forging having the shape of the blade section 23 including the excess thickness section 31 is molded. Next, the step proceeds to the cooling step of Step S2.

In the cooing step of Step S2, the forging, which is molded in the forging step and is in a high temperature state, is cooled. The forging is cooled to up the temperature suitable for the deburring step which is the next step. Next, the step proceeds to the deburring step of Step S3.

In the deburring step of Step S3, the unnecessary portions (burrs) of the forging, which are formed in a case where the forging material enters the gap between the upper and lower molds or the like when the die forging in the forging step is performed, are removed. Next, the step proceeds to the heat treatment step of Step S4.

In the heat treatment step of Step S4, the heat treatment is performed on the forging, and thus, the residual stress generated in the forging in the previous step (forging step) and the heat stress generated in the forging in the cooling process are released. Next, the step proceeds to the machining step of Step S5.

In the machining step of Step S5, the excess thickness section 31 of the forging is cut by cutting processing. Moreover, in the machining step, the platform is formed on the base end section side (blade base side) of the base section 23 and the shroud 24 is formed on the tip section side (blade tip side) thereof by the cutting processing. In this way, the rotor blade 15 having the intended final shape is formed. Thereafter, the required heat treatment (for example, solution treatment and aging treatment) is performed on the rotor blade 15, and thus, the required mechanical characteristics are applied to the rotor blade 15.

(Molding Method of Forging)

Figure 5:
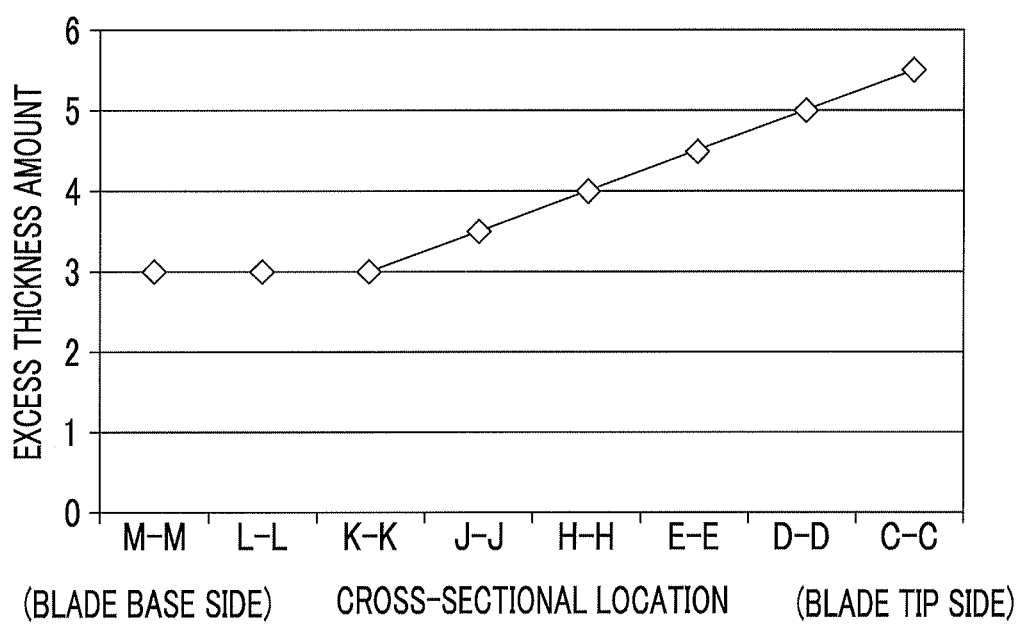
FIG. 5 is a graph showing an excess thickness amount at each cross-sectional location of the rotor blade including the excess thickness section after the forging.
Figure 6:
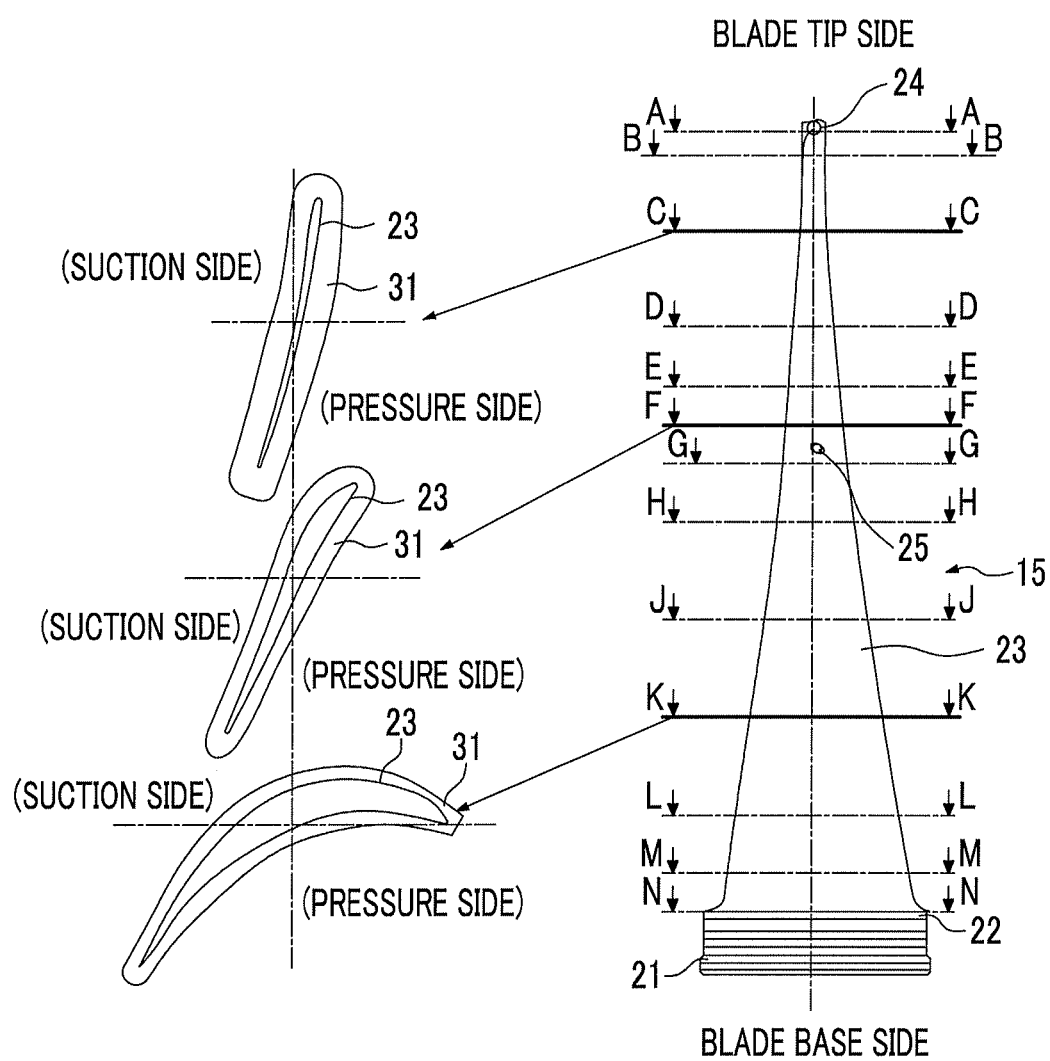
FIG. 6 is a view showing the excess thickness amount in a specific cross-sectional location of the rotor blade including the excess thickness section after the forging.

FIG. 5 is a graph showing the excess thickness amount at each cross-sectional location of the rotor blade including the excess thickness section after the forging. FIG. 6 is a view showing the excess thickness amount in a specific cross-sectional location of the rotor blade including the excess thickness section after the forging. With reference to FIGS. 4 to 6, the forging molded in the forging step of the first embodiment will be described.

In the forging step in the process for manufacturing the blade section 23 of the first embodiment, the forging is hot-forged so that a distance (excess thickness amount) from the blade surface of the blade section 23 to the surface of the excess thickness section 31a is substantially uniform along the entire periphery of the cross section of the blade section 23 and the excess thickness section 31 perpendicular to the blade length direction, as shown in FIG. 4, and so that the excess thickness amount, which is the thickness of the excess thickness section 31, gradually increases toward the blade tip side from a prescribed position (position of a K-K cross section) in the blade length direction, as shown in FIG. 5. That is, as shown in FIG. 4, during the operation of the steam turbine 1, the forging is hot-forged so that the excess thickness amount on a pressure side of the blade section 23 in which the pressure of the steam is increased and the excess thickness amount on a suction side in which the pressure becomes a negative pressure with respect to the pressure side are substantially uniform.

In FIGS. 5 and 6, an example is shown in which the excess thickness amount gradually increases from the K-K cross sectional location of the blade section 23 in the blade length direction toward the blade tip side. FIG. 6 shows a C-C cross-sectional view of the blade section 23, an F-F cross-sectional view, and a K-K cross-sectional view. The excess thickness amount of the excess thickness section 31 in the C-C cross-sectional section is the greatest, the excess thickness amount of the excess thickness section 31 in the K-K cross-sectional section is the smallest, and the excess thickness amount of the excess thickness section 31 in the F-F cross-sectional section is intermediate. Moreover, FIG. 4 shows the cross-sectional shape at any location from the K-K cross-sectional location, at which the increase in the excess thickness amount starts, to the tip section in the blade section 23. In the related art, the excess thickness section of the blade section is substantially uniform along the entire blade surface regardless of the position of the cross section in the blade length direction, and thus, an excess thickness amount W1 of the excess thickness section 31 in the blade section 23 of the first embodiment is greater than an excess thickness amount W1a of the excess thickness section 31a in the blade section 23 in the related art.

In addition, in the present embodiment, as shown in FIG. 5, the position at which the increase in the excess thickness amount of the blade section 23 starts is the K-K cross-sectional location. However, for example, the position at which the increase in the excess thickness amount of the blade section 23 starts in the blade length direction may be any position (for example, any position between the base end section of the blade section 23 and ¼ position of the length of the blade section 23 in the blade length direction, or the like) from the base end section of the blade section 23 to the center section. The position at which the increase in the excess thickness amount starts in the blade length direction is not limited to this. For example, since the plate thickness of the blade section 23 is thinned from the base end section to the tip section, the excess thickness amount gradually increases from the N-N cross-sectional location of the base end section toward the blade tip side. Alternatively, the position at which the increase in the excess thickness amount starts in the blade length direction may be any position from the base end section of the blade section 23 to the position at which the stub 25 is formed.

Moreover, as shown in FIG. 5, the excess thickness amount of the blade section 23 gradually increases linearly from the prescribed position in the blade length direction toward the blade tip side. However, the present invention is not limited to this, the excess thickness amount may gradually increase based on an arbitrary change amount.

As described above, in the forging step in the process for manufacturing the rotor blade 15, the forging is hot-forged so that the excess thickness amount of the blade section 23 is substantially uniform along the entire periphery of the cross section of the blade section 23 and the excess thickness section 31 perpendicular to the blade length direction, and so that the excess thickness amount, which is the thickness of the excess thickness section 31, gradually increases toward the blade tip side from the prescribed position in the blade length direction. Accordingly, in the blade length direction of the forging (the blade section 23 including the excess thickness section 31) which is molded by the die forging in the forging step, the difference in the thickness between a portion having a thick plate thickness and a portion having a thin plate thickness is substantially removed or decreased, and thus, stiffness of the entire forging is improved. Therefore, in the cooling step which is the next step of the forging step, heat stress does not easily occur in the inner portions of the blade section 23 and the excess thickness section 31, and it is possible to suppress occurrence of local plastic deformation of the blade section 23 and the excess thickness section 31 in the blade length direction. Since the occurrence of the local plastic deformation is suppressed, occurrence of the residual stress is suppressed, and it is possible to suppress occurrence of warping, bending, or twisting of the entire blade section 23. In addition, since processing which returns the blade section to the state before the plastic deformation is performed by cold working such as manual working or simple pressing when the local plastic deformation is generated is not necessary, or minimum work is required even when the working or the like is necessary, occurrence of the residual stress is suppressed, deviation in the shape of the blade section 23 is suppressed, and it is possible to decrease the work cost. Moreover, since the occurrence of the residual stress is suppressed during the cooling step, when the unnecessary portions (burrs) of the forging are removed in the deburring step or when the excess thickness section 31 is cut in the machining step, the release amount of the residual stress is decreased, and it is possible to suppress the occurrence of the warping, bending, or twisting of the entire blade section 23. In addition, in the heat treatment step which is generally performed before the machining step, even when the yield point is decreased due to the heating, the release amount of the residual stress is decreased, and it is possible to suppress the occurrence of the warping, bending, or twisting of the entire blade section 23. In addition, also when the forging is cooled after being heated in the heat treatment step, since the temperature difference between the portion having a thick plate thickness and the portion having a thin plate thickness in the blade length direction is decreased, the heat stress in the inner portions of the blade section 23 and the excess thickness section 31 does not easily occur, and it is possible to suppress the occurrence of the local plastic deformation of the blade section 23 and the excess thickness section 31 in the blade length direction. Since the occurrence of the local plastic deformation is suppressed, the occurrence of the residual stress is suppressed, and it is possible to suppress occurrence of warping, bending, or twisting of the entire blade section 23.

Moreover, in the cooling step after the forging step, even when a certain level of deformation in the entire blade occurs on the blade tip side portion of the forging in the blade length direction, since the excess thickness amount of the blade tip side portion is greater than the excess thickness amount of the blade base side portion, the final shape of the blade section 23 satisfies the forging in which the deformation of the entire blade is generated. Accordingly, since a processing margin remains on the blade tip side portion, it is possible to machine (for example, cut) the processing margin. Therefore, since it is not necessary to perform the processing which returns the blade section to the shape similar to the shape of the final blade section 23 by cold working such as manual working or simple pressing, it is possible to suppress the residual stress generated due to the processing.

Second Embodiment

With respect to a process for manufacturing a steam turbine rotor blade of a second embodiment, differences between the process for manufacturing the steam turbine rotor blade of the first embodiment and that of the second embodiment will be mainly described. The entire flow of the process for manufacturing the rotor blade of the second embodiment is similar to the entire flow of the process for manufacturing the rotor blade of the first embodiment.

(Mold Method of Forging)

Figure 7:
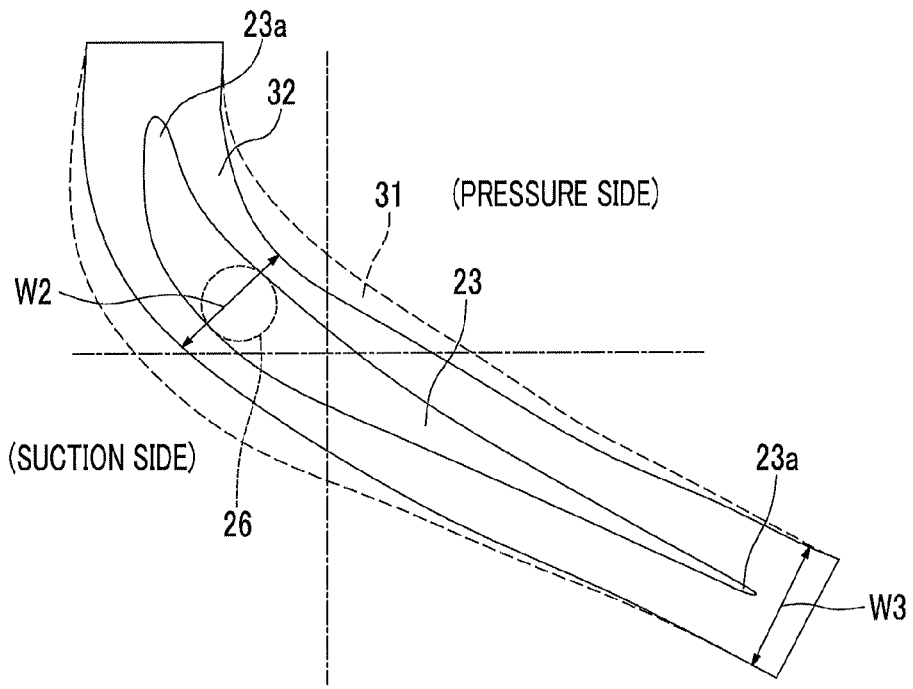
FIG. 7 is a cross-sectional view of a rotor blade including an excess thickness section after forging in a second embodiment.

FIG. 7 is a cross-sectional view of a rotor blade including the excess thickness section after the forging in the second embodiment. With reference to FIG. 7, the forging molded in the forging step of the second embodiment will be described.

In the forging step in the process for manufacturing the blade section 23 of the second embodiment, the forging (including the blade section 23 provided with an excess thickness section 32) is hot-forged so that the excess thickness amounts in edge sections 23a which are both ends in the length directions of the cross sections of the blade section 23 and the excess thickness section 32 perpendicular to the blade length direction are greater than the excess thickness amount in a maximum diameter section 26 which is a portion having the thickest plate thickness of the blade section 23 in the cross section, as shown in FIG. 7. That is, distribution is assigned to the excess thickness amount on the periphery of the cross section of the blade section 23 and the excess thickness section 32 perpendicular to the blade length direction. Specifically, in the forging step, the forging is hot-forged so that a plate thickness W3 of the forging in the edge section 23a is equal to or more than a plate thickness W2 of the forging in the maximum diameter section 26. In this way, as shown in FIG. 7, the excess thickness amount in the maximum diameter section 26 of the excess thickness section 32 in the second embodiment is smaller than the excess thickness amount in the maximum diameter section 26 of the excess thickness section 31 in the first embodiment.

Moreover, similar to the first embodiment, also in the second embodiment, in the forging step, the forging is hot-forged so that the excess thickness amount gradually increases from the prescribed position toward the blade tip side of the forging in the blade length direction. However, in the second embodiment, since the distribution is assigned to the excess thickness amount on the periphery of the cross section of the blade section 23 and the excess thickness section 32 perpendicular to the blade length direction, the forging may be hot-forged so that the average value of the excess thickness amounts having the distribution gradually increases from the prescribed position toward the blade tip side.

As described above, in the forging step in the process for manufacturing the rotor blade 15, the forging is hot-forged so that the excess thickness amounts in edge sections 23a which are both ends in the length direction of the cross section of the blade section 23 and the excess thickness section 32 perpendicular to the blade length direction are greater than the excess thickness amount in the maximum diameter section 26 which is a portion having the thickest plate thickness of the blade section 23 in the cross section. Specifically, in the forging step, the forging is hot-forged so that a plate thickness W3 of the forging in the edge section 23a is equal to or more than a plate thickness W2 of the forging in the maximum diameter section 26. That is, since the excess thickness amount in the edge section 23a having a small plate thickness is increased and the excess thickness amount in the maximum diameter section 26 having a great plate thickness is decreased, the plate thicknesses in the cross sections of the blade section 23 and the excess thickness section 32 are substantially uniform over the entire length direction. Accordingly, in the length directions of the cross sections of the blade section 23 and the excess thickness section 32 of the forging perpendicular to the blade length direction, the difference in the thicknesses between the portion having a great plate thickness and the portion having a small plate thickness is substantially removed or decreased. Therefore, in the cooling step which is the next step of the forging step, heat stress does not easily occur in the inner portions of the blade section 23 and the excess thickness section 32, occurrence in the local plastic deformation in the length direction of the cross section is suppressed, occurrence of the residual stress is suppressed, and it is possible to suppress occurrence of warping, bending, or twisting of the entire blade section 23. Moreover, it is needless to say that the second embodiment exerts operations and effects similar to those of the first embodiment.

Third Embodiment

With respect to a process for manufacturing a steam turbine rotor blade of a third embodiment, differences between the process for manufacturing the steam turbine rotor blade of the second embodiment and that of the third embodiment will be mainly described. In addition, the entire flow of the process for manufacturing the rotor blade of the third embodiment is similar to the entire flow of the process for manufacturing the rotor blade of the first embodiment.

(Mold Method of Forging)

Figure 8:
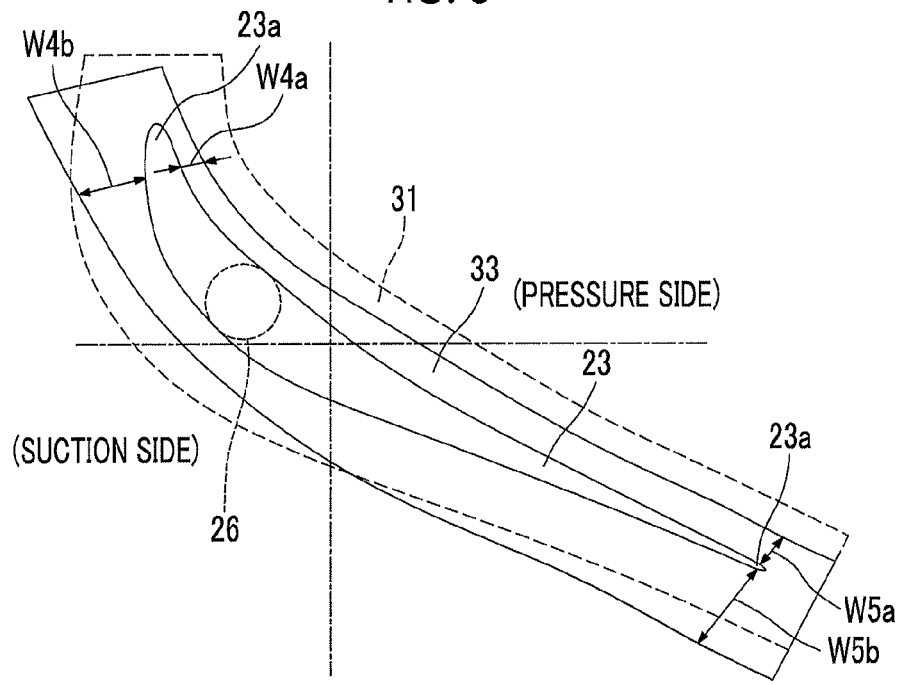
FIG. 8 is a cross-sectional view of a rotor blade including an excess thickness section after forging in a third embodiment.

FIG. 8 is a cross-sectional view of a rotor blade including the excess thickness section after the forging in the third embodiment. With reference to FIG. 8, the forging molded in the forging step of the third embodiment will be described.

In the forging step in the process for manufacturing the blade section 23 of the third embodiment, the forging (including the blade section 23 provided with an excess thickness section 33) is hot-forged so that in the excess thickness amounts in edge sections 23a which are both ends in the length directions of the cross sections of the blade section 23 and the excess thickness section 33 perpendicular to the blade length direction, the excess thickness amount of the pressure side in which the cross-sectional shape is a concave shape is smaller than the excess thickness amount of the suction side in which the cross-sectional shape is a convex shape, as shown in FIG. 8. That is, distribution is assigned to the excess thickness amount of the periphery of the above-described cross section. Specifically, in the forging step, the forging is hot-forged so that the excess thickness amounts W4a and W5a of the pressure side in which the cross-sectional shape in the edge section 23a of the forging is a concave shape are smaller than the excess thickness amounts W4b and W5b of the suction side in which the cross-sectional shape is a convex shape, respectively. In addition, in the forging step, the relationship between the plate thickness in the edge section 23a of the forging and the plate thickness in the maximum diameter section 26 of the forging is similar to that of the second embodiment. Accordingly, a degree of curvature in the length direction of the cross sections of the blade section 23 and the excess thickness section 33 perpendicular to the blade length direction in the third embodiment is smaller than the degree of curvature in the length direction of the cross sections of the blade section 23 and the excess thickness section 32 perpendicular to the blade length direction in the second embodiment, and the cross sections of the blade section 23 and the excess thickness section perpendicular to the blade length direction are approximately rectangular shapes.

As described above, in the forging step in the process for manufacturing the rotor blade 15, the forging is hot-forged so that in the excess thickness amounts in edge sections 23a which are both ends in the length directions of the cross sections of the blade section 23 and the excess thickness section 33 perpendicular to the blade length direction, the excess thickness amount of the pressure side in which the cross-sectional shape is a concave shape is smaller than the excess thickness amount of the suction side in which the cross-sectional shape is a convex shape. According to this processing, since the degree of curvature in the length direction of the cross sections of the blade section 23 and the excess thickness section 33 perpendicular to the blade length direction is decreased, even when heat stress occurs in the cooling step, occurrence in the local plastic deformation in the length direction of the cross section is suppressed, occurrence of the residual stress is suppressed, and it is possible to suppress occurrence of warping, bending, or twisting of the entire blade section 23. Moreover, it is needless to say that the third embodiment exerts operations and effects similar to those of the first embodiment and second embodiment.

Fourth Embodiment

With respect to a process for manufacturing a steam turbine rotor blade of a fourth embodiment, differences between the process for manufacturing the steam turbine rotor blade of the first embodiment and that of the fourth embodiment will be mainly described. In addition, the entire flow of the process for manufacturing the rotor blade of the fourth embodiment is similar to the entire flow of the process for manufacturing the rotor blade of the first embodiment.

(Forming Method of Forging)

Figure 9:
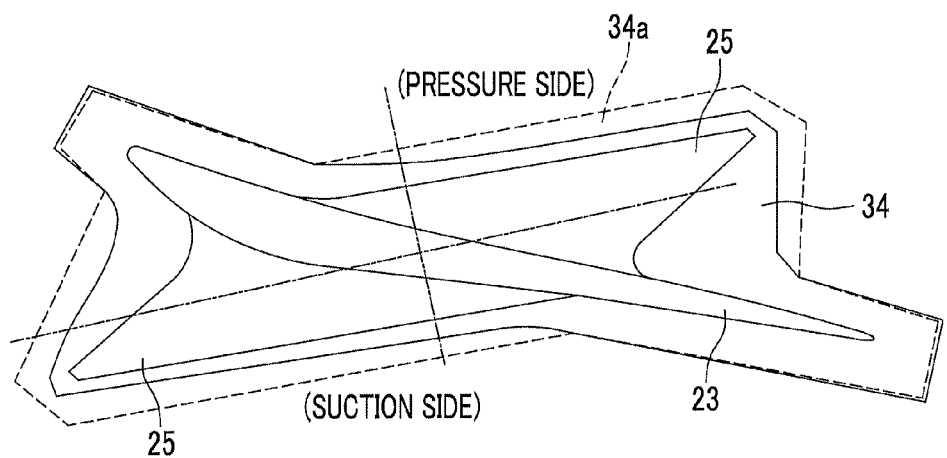
FIG. 9 is a cross-sectional view in a position at which a stub is formed in a rotor blade including an excess thickness section after forging in a fourth embodiment.
Figure 10:
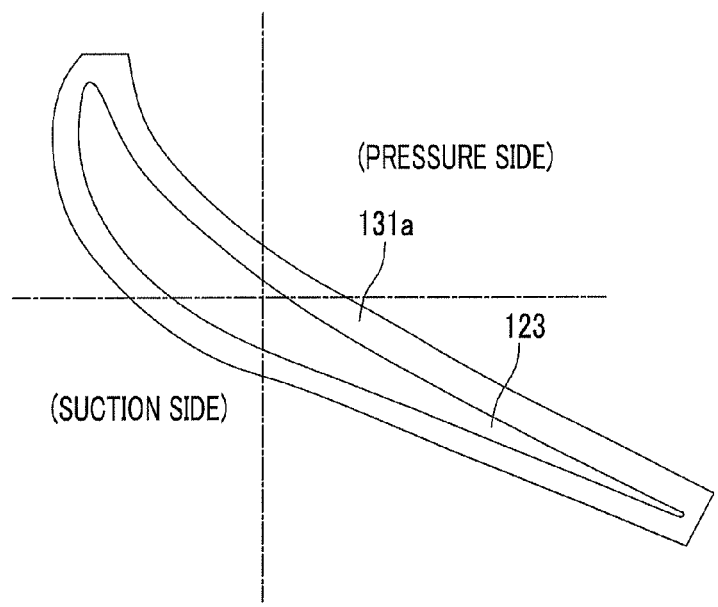
FIG. 10 is a cross-sectional view of a rotor blade including an excess thickness section after forging in the related art.
Figure 11:
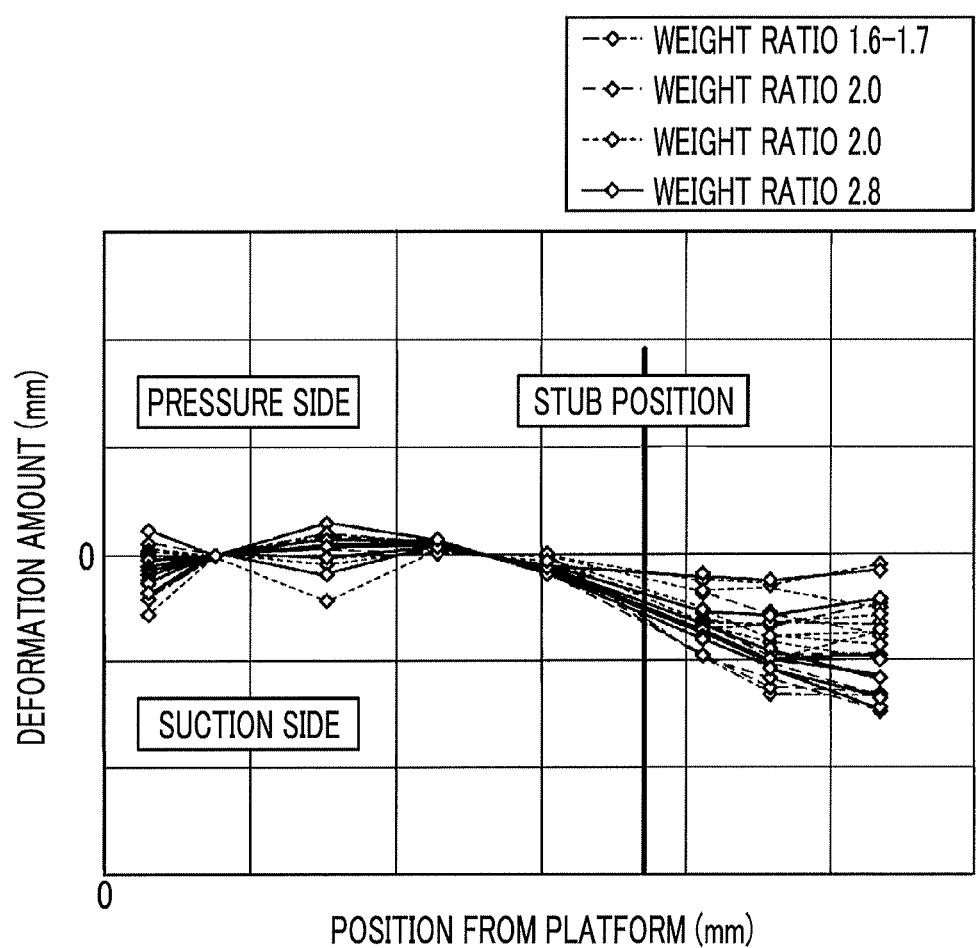
FIG. 11 is a graph showing a plastic deformation amount in a blade length direction of the rotor blade including the excess thickness section after forging in the related art.

FIG. 9 is a cross-sectional view in a position at which a stub is formed in a rotor blade including an excess thickness section after the forging in the fourth embodiment. With reference to FIG. 9, the forging which is molded in the forging step of the fourth embodiment will be described.

FIG. 9 shows the cross sections of the blade section and the excess thickness section 34 perpendicular to the blade length direction at the position at which the stub 25 is formed in the blade section 23. In the forging step in the process for manufacturing the blade section 23 in the fourth embodiment, the forging (including the blade section 23 provided with an excess thickness section 34) is hot-forged so that the excess thickness amounts in the stubs 25 of the cross sections of the blade section 23 and the excess thickness section 34 perpendicular to the blade length direction at the position at which the stubs 25 are formed in the blade section 23 are smaller than the excess thickness amount of a portion other than the stubs 25, as shown in FIG. 9. In FIG. 9, the excess thickness section, in which the excess thickness amount is substantially uniform (as shown in FIG. 9, there is a portion in which the excess thickness amount cannot be uniform due to the limitation by the die forging of the mold) along the entire periphery of the cross section of the blade section 23 in the first embodiment, is defined as an excess thickness section 34a. Accordingly, the areas of the cross sections of the blade section 23 and the excess thickness section 34 perpendicular to the blade length direction in the position at which the stubs 25 are formed in the blade section 23 are smaller than the areas of the cross sections of the blade section 23 and the excess thickness section 34a perpendicular to the blade length direction in the position.

Therefore, the difference between the area of the cross section of the forging perpendicular to the blade length direction in the position at which the stub 25 is formed in the blade section 23, and the areas of the cross sections at other positions is smaller than the forging of the first embodiment. Accordingly, in the cooling step which is the next step of the forging step, compared to the first embodiment, occurrence of the heat stress in the inner portion of the forging is further suppressed, occurrence of the plastic deformation in the blade length direction of the forging is further suppressed, occurrence of the residual stress is further suppressed, and it is possible to further suppress the warping, bending, or twisting of the entire blade section 23.

In addition, in the first to fourth embodiments, the method of manufacturing the rotor blade 15 is applied to the rotor blade in the steam turbine. However, the present invention is not limited to this, and for example, the present invention may be applied to the method of manufacturing the rotor blade in other rotary machines such as a gas turbine.

Hereinbefore, the first to fourth embodiments are described. However, the first to fourth embodiments are not limited by the above-described contents. In addition, the components of the first to fourth embodiments include components which are easily conceived by a person skilled in the art, components which are substantially same as the components, and components within a so-called equivalent range. Moreover, the above-described components may be appropriately combined. In addition, various omissions, replacements, and modifications may be applied to the components within a range which does not depart from the gist of the first to fourth embodiments.

REFERENCE SIGNS LIST

1: STEAM TURBINE
11: CASING
12: ROTOR
13: BEARING
14: ROTOR DISK
15: ROTOR BLADE
16: STATOR BLADE
17: STEAM PASSAGE
18: STEAM SUPPLY PORT
19: STEAM DISCHARGE PORT
21: BLADE BASE SECTION
22: PLATFORM
23: BLADE SECTION
23A: EDGE SECTION
24: SHROUD
25: STUB
26: MAXIMUM DIAMETER SECTION
31, 31A, 32, 33, 34, 34A: EXCESS THICKNESS SECTION
123: BLADE SECTION
131A: EXCESS THICKNESS SECTION
W1, W1a: EXCESS THICKNESS AMOUNT
W2, W3: PLATE THICKNESS
W4a, W4b, W5a, W5b: EXCESS THICKNESS AMOUNT

The invention claimed is:

1. A method for manufacturing a turbine rotor blade in which a plurality of the rotor blades are fixed to be arranged along the peripheral direction of a rotor on the outer periphery of the rotor rotatably supported in a turbine, comprising:
   a forging step of providing an excess thickness section on a blade section of the rotor blade, and molding a forging, in which an excess thickness amount which is the thickness of the excess thickness section increases from a prescribed position of the blade section in a blade length direction toward a blade tip side, by die forging;
   a machining step of cutting the excess thickness section from the forging and forming the blade section; and
   a molding step of molding the forging, in which the excess thickness amount is substantially uniform in the entire periphery of a cross section of the blade section perpendicular to the blade length direction in at least a portion of the blade section and the excess thickness section in the blade length direction, by die forging in the forging step.

2. The method for manufacturing a turbine rotor blade according to claim 1, wherein the prescribed position is any position between a base end section of the blade section and a center section of the blade section.

3. The method for manufacturing a turbine rotor blade according to claim 1, wherein the prescribed position is any position between a base end section of the blade section and a position of a stub which is formed on the blade section.

4. The method for manufacturing a turbine rotor blade according to claim 1, wherein the prescribed position is any position between a base end section of the blade section and a position of ¼ of the length of the blade section in the blade length direction.

* * * * *